United States Patent
Muchherla et al.

(10) Patent No.: US 12,430,258 B2
(45) Date of Patent: *Sep. 30, 2025

(54) PADDING CACHED DATA WITH VALID DATA FOR MEMORY FLUSH COMMANDS

(71) Applicant: Micron Technology, Inc., Boise, ID (US)

(72) Inventors: Kishore Kumar Muchherla, San Jose, CA (US); Jonathan S. Parry, Boise, ID (US); Akira Goda, Tokyo (JP)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/672,645

(22) Filed: May 23, 2024

(65) Prior Publication Data

US 2024/0311309 A1    Sep. 19, 2024

Related U.S. Application Data (63) Continuation of application No. 17/898,779, filed on Aug. 30, 2022, now Pat. No. 12,019,557.

(51) Int. Cl.
| | |
|---|---|
| *G06F 12/0891* | (2016.01) |
| *G06F 12/0831* | (2016.01) |
| *G06F 13/16* | (2006.01) |
| *G06F 12/02* | (2006.01) |
| *G06F 12/0868* | (2016.01) |
| *G06F 12/0886* | (2016.01) |
| *G06F 12/12* | (2016.01) |

(52) U.S. Cl.
CPC ...... *G06F 12/0891* (2013.01); *G06F 12/0833* (2013.01); *G06F 13/1668* (2013.01)

(58) Field of Classification Search
CPC ............ G06F 12/0891; G06F 12/0833; G06F 13/1668
USPC ........................................................ 711/154
See application file for complete search history.

(56) References Cited

U.S. PATENT DOCUMENTS

| | | | |
|---|---|---|---|
| 2012/0239871 A1 | 9/2012 | Badam et al. | |
| 2015/0170747 A1* | 6/2015 | Liu | G11C 16/107 365/185.03 |
| 2016/0041902 A1* | 2/2016 | Atkisson | G06F 12/0246 711/103 |
| 2017/0286288 A1 | 10/2017 | Higgins et al. | |
| 2019/0114106 A1 | 4/2019 | Elie et al. | |
| 2020/0211603 A1 | 7/2020 | Luo et al. | |

* cited by examiner

*Primary Examiner* — Arpan P. Savla
*Assistant Examiner* — Sidney Li
(74) *Attorney, Agent, or Firm* — Lowenstein Sandler LLP (57) ABSTRACT

A victim management unit (MU) for performing a media management operation is identified. The victim MU stores valid data in a first memory device of a plurality of memory devices. A cached data item on a second memory device of the plurality of memory devices is identified. A valid-to-invalid ratio of the victim MU is compared to a threshold value. In view of comparison, it is determined whether to pad the cached data item with at least a subset of the valid data stored at the victim MU or dummy data. Based on the determination, the cached data item padded with one of at least a subset of the valid data stored at the victim MU or the dummy data is written to a target MU.

20 Claims, 5 Drawing Sheets

PADDING CACHED DATA WITH VALID DATA FOR MEMORY FLUSH COMMANDS

RELATED APPLICATION

The present Application is a Continuation of, and claims priority to, U.S. patent application Ser. No. 17/898,779, filed on Aug. 30, 2022, entitled "PADDING CACHED DATA WITH VALID DATA FOR MEMORY FLUSH COMMANDS," which is incorporated herein by reference in its entirety for all purposes.

TECHNICAL FIELD

Embodiments of the disclosure relate generally to memory sub-systems, and more specifically, relate to padding cached data with valid data for memory flush commands.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to padding cached data with valid data for memory flush commands. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane can include of a set of physical blocks. Each block can include of a set of pages. Each page can include of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For case of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system. The memory sub-system controller can then receive the data and store it at a memory device. In response to storing the data successfully at the memory device, the memory sub-system controller can send an acknowledgment to the host system.

To speed up the input/output (I/O) operations, a host system can send a cache-enable instruction to the memory sub-system. The cache-enable instruction enables the memory sub-system to store data received from the host in a cache on volatile memory, and send an acknowledgment to the host acknowledging completion of the write request. The memory sub-system controller can then determine when to write the cached data to non-volatile memory. Writing data to cache is often faster than writing to non-volatile memory. While a cache-enable instruction can speed up the IO operations, the risk of losing the data stored in the cache is increased as the cached data may be lost in the event of an unexpected power loss.

By enabling the cache feature, the host system is accepting the risk that the data may not immediately be stored on non-volatile memory. At times, however, the host can send data to the memory sub-system that needs to be stored on non-volatile memory. The host can send a cache-disable instruction prior to sending the write command that contains data that needs to be stored on non-volatile memory. However continually sending cache-enable and cache-disable instructions can be cumbersome, and can unnecessarily consume resources that could be used for other operations. As an alternative to switching between cache-enable and cache-disable functionalities, the host can send the data that needs to be stored on non-volatile memory, and then send a flush command to the memory sub-system, instructing the memory sub-system to write all cached data to non-volatile memory.

In order to execute the flush command, the memory sub-system controller may need to pad the cached data with dummy data in order to meet the write granularity of the memory device. That is, for some memory devices, such as NAND devices, data can only be written in a certain granularity. For example, for some memory devices, the minimum write granularity is 16 KB (i.e., data can only be written 16 KB at a time). Thus, to execute a flush command for a cache that is storing less than 16 KB of data, the memory sub-system controller would need to pad the data with dummy data in order to satisfy the minimum write granularity. For example, if the cached data is 4 KB in size, the memory sub-system controller can append 12 KB of dummy data to the 4 KB in order to store it on non-volatile memory.

Padding the data with dummy data can negatively impact the performance and lifespan of the memory device. Generating and storing the dummy data consumes resources and energy, and contributes to write amplification. Write amplification manifests itself by the amount of physical data to be written to the storage media being a multiple of the logical amount of data manipulated by the host. Furthermore, the problem grows exponentially as technology progresses. For example, some memory devices may program data in a multi-plane mode. Thus, for a memory device that programs in a multi-plane mode over six planes, the memory sub-system controller would write 96 KB at a time (6 times 16 KB). Thus, to flush 4 KB of data to non-volatile memory, the memory sub-system controller would generate 92 KB of dummy data.

Aspects of the present disclosure address the above and other deficiencies by having a memory sub-system that can use existing valid data to pad cached data when executing a flush command. The existing data can be data that the memory sub-system controller is relocating within the memory sub-system due to a media management operation such as garbage collection. Garbage collection is a set of operations that include, for example, selecting a management unit that contains invalid and valid data, identifying pages in the management unit that contain valid data, copying the valid data to new locations (e.g., free pages in another management unit), and erasing the selected management unit. A management unit (e.g., a block, or a superblock) can include one or more pages containing valid data, while the remaining pages in the MU contain invalid data. To perform a media management operation (e.g., garbage collection), the memory sub-system controller can select a victim MU that stores valid data. When the memory sub-system controller receives a flush command from the host system, the memory sub-system controller can identify the selected victim MU, and use the valid data stored at the selected victim MU to pad the cached data that is to be flushed.

The memory sub-system controller can then identify a target MU, residing on a non-volatile memory device, at which to store the cached data. The target MU can be indicated by a host cursor as the next available management on the memory device. In some embodiments, the target MU can be identified by the garbage collection operations, as the location at which to store the valid data being garbage collected.

Before executing the flush command, the memory sub-system controller can determine whether the cached data satisfies a size criterion. In some embodiments, the size criterion can correspond to the size granularity of the memory device on which the target MU resides. That is, if the size of the cached data is less than the size granularity of the memory device, the size condition is satisfied. In some embodiments, the size criterion can be satisfied if that the size of the cached data is less than a threshold. The threshold can relate to the amount of data needed to pad the cached data to satisfy the write granularity of the target MU. In some embodiments, the threshold can be a percentage of the write granularity of the target MU. For example, threshold can be 90% of the write granularity, meaning that the size criterion is satisfied if the size of the cached data is below 90% of the write granularity of the target MU. If the size of the cached data is above the threshold, the memory sub-system controller can pad the cached data with dummy data (e.g., randomly generated data, or a series of zeros).

In some embodiments, the threshold can be pre-determined and can be based on the type of memory. Alternatively or additionally, the threshold can be determined by the memory sub-system controller based on metrics associated with the victim MU. In some embodiments, the memory sub-system controller can identify certain parameters associated with the victim MU and the cached data to determine whether to pad the cached data with dummy data or with valid data stored at the victim MU. The parameters be tracked by the memory sub-system controller in or near real time, and can include the dummy-to-host ratio of the cached data, and the valid-to-invalid ratio of the victim MU (i.e., the size of the valid data compared to the size of the invalid data stored at the victim MU). The dummy-to-host ratio of cached data illustrates the relationship between the amount of padding data needed to satisfy the write granularity and the size of the cached data. The "dummy" in the dummy-to-host ratio reflects the write granularity minus the size of the cached data, and the "host" in the dummy-to-host ratio reflects the size of the cached data. For example, if the cached data is 4 KB, and the write granularity is 96 KB, the dummy-to-host ratio is 92 KB-to-4 KB. The valid-to-invalid ratio of the victim MU illustrates the relationship between the amount of valid data stored at the victim MU and the amount of invalid data stored at the victim MU. If the valid-to-invalid ratio exceeds a predefined threshold value, the memory sub-system can use the valid data stored at the victim MU to pad the cached data. The predefined threshold value can correlate to an acceptable write amplification penalty incurred due to garbage collecting the victim MU.

Thus, if the valid-to-invalid ratio is less than or equal to the predefined threshold value correlating to an acceptable write amplification penalty, using dummy data to pad the cached data is unlikely to adversely affect the write amplification experienced by the memory sub-system. If the valid-to-invalid ratio is greater than the predefined threshold value correlating to the acceptable write amplification penalty, using dummy data to pad the cached data is undesirable (i.e., using dummy data to pad the cached data is likely to adversely affect the write amplification experienced by the memory sub-system). Hence, if the valid-to-invalid ratio of the victim MU is greater than the threshold value, the memory sub-system controller can use the valid data stored at the victim MU to pad the cached data. If the valid-to-invalid ratio of the victim MU is less than or equal to the threshold value, the memory sub-system controller can use dummy data to pad the cached data.

In some embodiments, the memory sub-system controller can read the valid data stored at the victim MU and store the valid data to a media management cache. Then, upon receiving a flush command from the host system, the memory sub-system controller can use the data stored in the media management cache to pad the cached data to be flushed. In some embodiments, the memory sub-system controller can store the valid data to a media management cached in response to determining that the valid-to-invalid ratio is greater than the predefined threshold value correlated to the acceptable write amplification penalty. In some embodiments, if the valid-to-invalid ratio is greater than the predefined threshold value, upon receiving a flush command, the memory sub-system controller pairs the cached data with at least a subset of the media management cache and commits the paired data to the location specified by a host cursor. The host cursor can be represented by a pointer that is maintained by the memory sub-system controller to reference the next available management unit on the memory device. In some embodiments, if a flush command is not received within a certain period of time, the memory sub-system controller can commit the valid data stored to the media management cache to the garbage collection cursor. The period of time can be determined by a predetermined maximum time period (e.g., 5 seconds), and/or can be related to the amount of host data written before receiving a flush command. Thus, if a flush command is received within an amount of data that is written by the host, then the memory sub-system controller can write the valid data and the cached data to the next available MU referenced by the host cursor. The amount of data can be the amount of data needed to pad the valid data in order to reach the write granularity of the MU referenced by the host cursor. In some embodiments, if the valid-to-invalid ratio is less than or equal to the predefined threshold value, the memory sub-system controller can commit the valid data stored to the media management cache to a garbage collection cursor.

Advantages of the present disclosure include, but are not limited to, improved performance and endurance in the memory sub-system. By padding cached data with existing valid data that is selected for a media management operation rather than with generated dummy data, the overall write amplification is reduced. The memory sub-system does not need to generate dummy data, and can perform fewer operations to achieve the desired outcome. Furthermore, aspects of the present disclosure result in energy savings, as the memory sub-system does not need to generate, transfer, and write dummy data to non-volatile memory.

Figure 1:
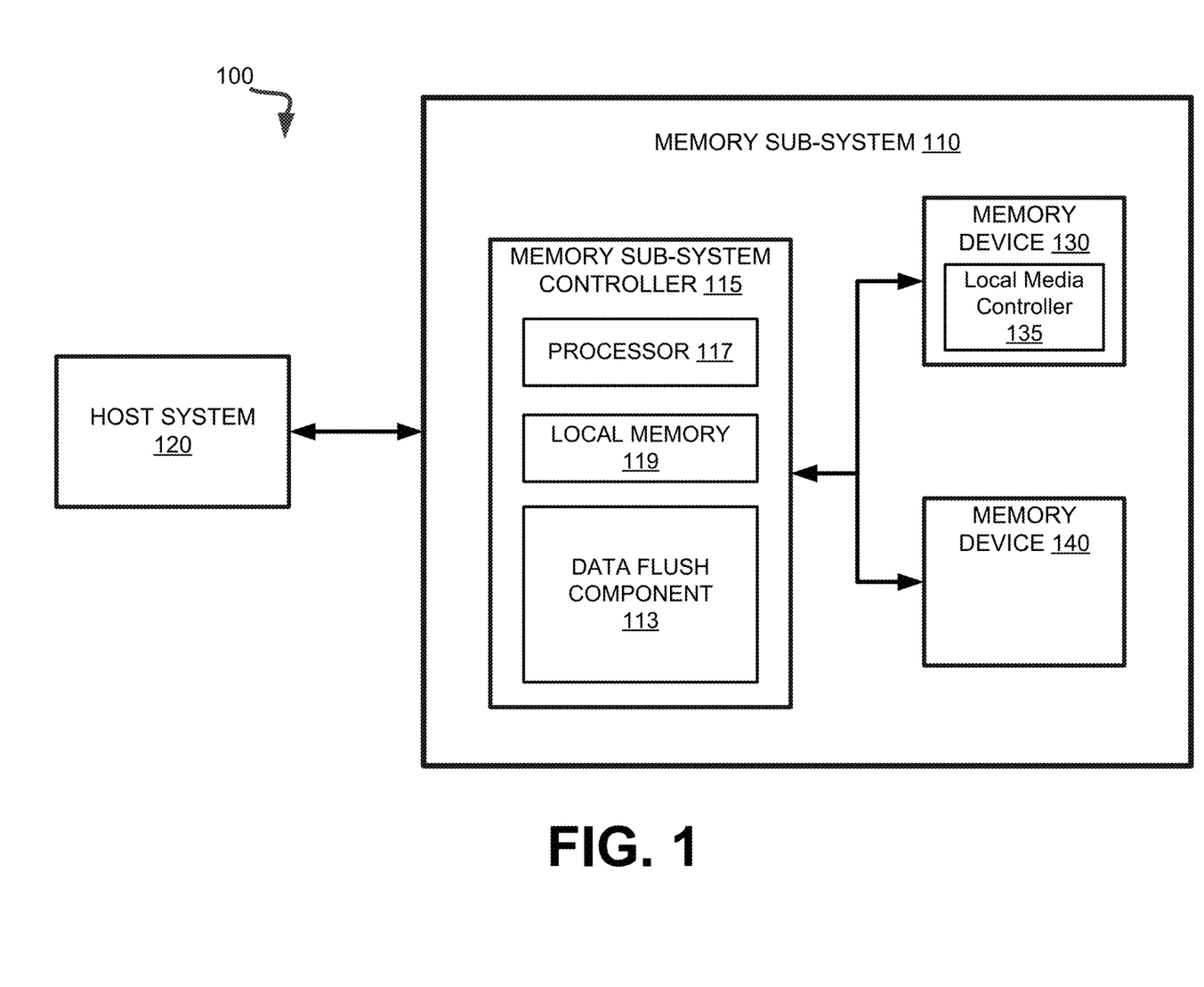
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a data flush component 113 that can pad cached data with valid data when executing a flush command. In some embodiments, the memory sub-system controller 115 includes at least a portion of the data flush component 113. In some embodiments, the data flush component 113 is part of the host system 120, an application, or an operating system. In other embodiments, local media controller 135 includes at least a portion of data flush component 113 and is configured to perform the functionality described herein.

The data flush component 113 can receive a flush command from host system 120. In some embodiments, memory sub-system controller 115 can store data received from host system 120 to a write cache on volatile memory, such as SRAM or DRAM (e.g., memory device 140). Memory sub-system controller 115 can occasionally write data stored to the write cache to non-volatile memory, such as memory device 130. Upon receiving a flush command from host system 120, memory sub-system controller 115, via data flush component 113, flushes the data items stored to the write cache by writing them to non-volatile memory, such as memory device 130.

In the event that the size of the data item stored to the write cache is less than the write granularity of the non-volatile memory device 130 to which the cached data item is to be written, the data flush component 113 can pad the cached data item to satisfy the write granularity. While the memory sub-system controller 115 receives operations from host system 120, the memory sub-system controller 115 can be performing media management operations (such as garbage collection) in the background. Garbage collection operations can include selecting a victim management unit (MU) to evict. The victim MU stores both valid and invalid data, and can be selected by the memory sub-system controller 115 based on the ratio of valid-to-invalid data stored at the victim MU (e.g., MUs that a lower valid-to-invalid ratio can be selected for eviction before MUs that have a higher valid-to-invalid ratio, thus minimizing the write amplification factor of the memory sub-system by reducing the amount of valid data rewritten during garbage collection operations). Garbage collection ensures that an empty MU will be available when one is needed to write data from the host. However, in performing garbage collection, the memory sub-system controller 115 can proactively select the victim MU before an empty MU is actually needed. Thus, the victim MU need not be erased as soon as it is selected as the victim MU. Accordingly, the flush component 113 can identify the data stored at the victim MU, and use the valid data stored at the victim MU to perform flush commands prior to the victim MU being erased by garbage collection operations.

The data flush component 113 can determine the size of the cached data items to be flushed to non-volatile memory. The data flush component 113 can then determine the amount of data stored at the victim MU to append to the cached data items in order to satisfy the write granularity of the target MU by subtracting the size of the cached data items from the write granularity. The target MU can be referenced by the host cursor, or by a garbage collection cursor in a multi-cursor implementation. In some embodiments, the data flush component 113 can retrieve data from more than one victim MU to satisfy the write granularity of the target MU.

In some embodiments, the data flush component 113 can compare the size of the cached data item to the size granularity of the target MU to determine whether to use the valid data stored at the victim MU to pad the data. If the amount of data needed to pad the cached data item to satisfy the write granularity of the target MU is below a threshold amount, the data flush component 113 can pad the cached data item with dummy data. In some embodiments, the memory sub-system controller 115 can maintain a valid-to-invalid ratio threshold value that correlates to an acceptable write amplification penalty due to performing garbage collection operations on the corresponding victim MU. The acceptable write amplification penalty threshold value can represent the percentage of valid data stored at a victim MU that can be garbage collected while not adversely affecting the performance and/or endurance of the memory sub-system 110. A high valid-to-invalid ratio can imply that the memory sub-system 110 is operating at higher write amplification, while a low valid-to-invalid ratio can imply that the memory sub-system 110 is operating at low write amplification. A valid-to-invalid ratio that is less than or equal to the threshold value can indicate that the write amplification due to padding the cached data with dummy data is unlikely to adversely affect the write amplification experienced by the memory sub-system 110. Thus, if the valid-to-invalid ratio of the victim MU is less or equal to the threshold value, the data flush component 113 can pad the cached data item with dummy data. If the valid-to-invalid ratio exceeds the threshold value, the data flush component 113 can use the valid data to pad the cached data item in executing the flush command.

When executing the flush command, the data flush component 113 writes the cached data items along with the retrieved data from the victim MU to the target MU to non-volatile memory. In some embodiments, the data flush component 113 can proactively retrieve data from selected victim MU and store the retrieved valid data a media management cache. In some embodiments, the data flush component 113 proactively retrieves data from the selected victim MU and stores it in a media management cache only if the valid-to-invalid ratio exceeds the threshold value correlating to the write amplification penalty. The media management cache can be on volatile memory device 140, or in local memory 119, for example. Then, when the data flush component 113 receives a flush command from host system 120, the data flush component 113 can pad the cached data items with data stored in the media management cache.

Further details with regards to the operations of the data flush component 113 are described below.

Figure 2:
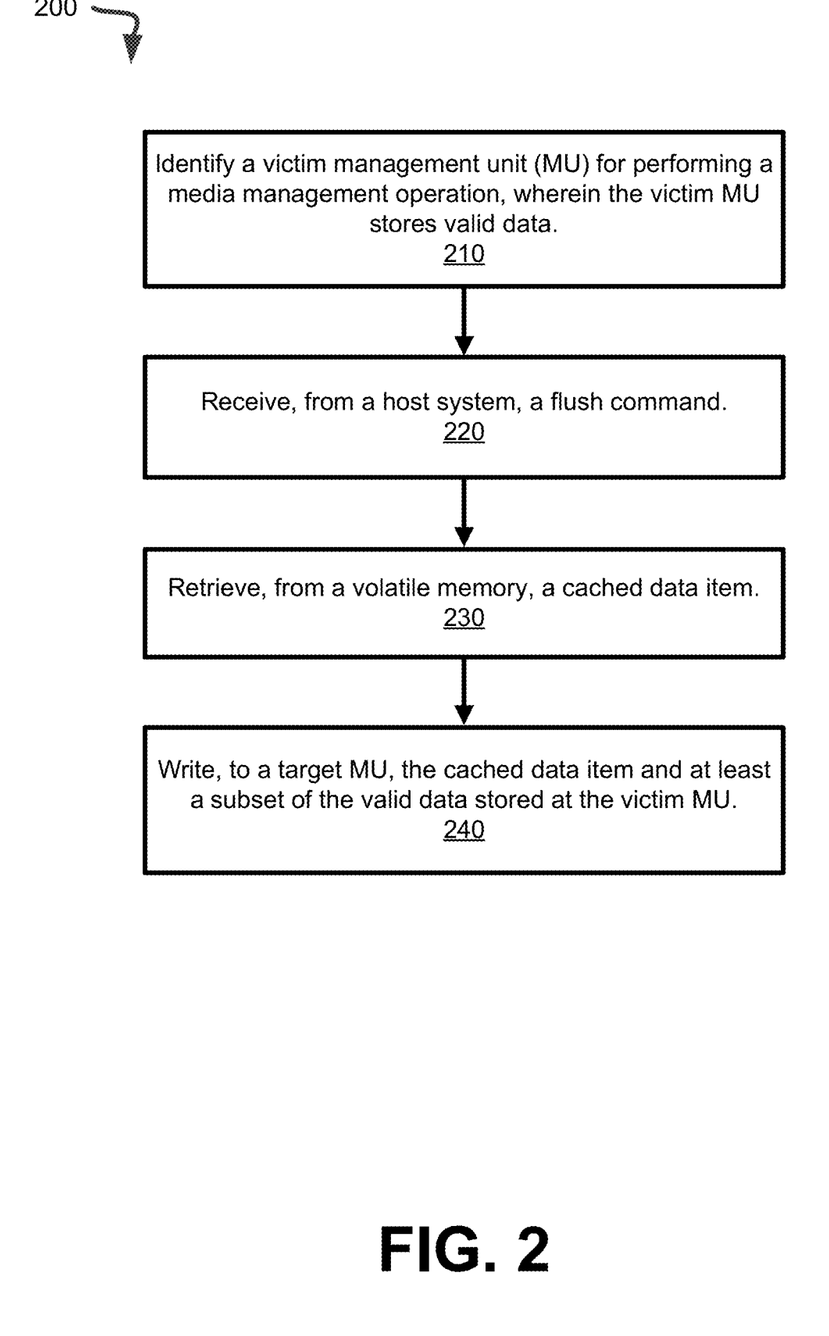
FIG. 2 is a flow diagram of an example method to pad a cached data item with valid data when executing a flush command, in accordance with some embodiments of the present disclosure.

FIG. 2 is a flow diagram of an example method 200 to pad a cached data item with valid data when executing a flush command, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the data flush component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic identifies a victim management unit (MU) for performing a media management operation. The victim MU can be selected for a garbage collection operation, for example, and can store valid data. At operation 220, the processing logic receives, from a host system, a flush command. The flush command can include an instruction to write the data item(s) stored in a cache on volatile memory to non-volatile memory.

At operation 230, the processing logic retrieves, from volatile memory, a cached data item. That is, the processing logic identifies a data item stored in a cache on the volatile memory. The cached data item can be host data received from the host system. In some embodiments, the processing logic can determine that the size of the retrieved cached data item is less than the write granularity of the memory device.

At operation 240, the processing logic writes, to a target MU, the cached data item and at least a subset of the valid data stored at the victim MU. The target MU references non-volatile memory. In some embodiments, the target MU can be identified by the processing logic during the garbage collection operation; the target MU can be the MU to which the valid data stored at the selected victim MU is to be stored. In some embodiments, the target MU can be the next available MU referenced by a host cursor, or by a garbage collection cursor in a multi-cursor implementation.

The processing logic can determine the size of the subset of the valid data by subtracting the size of the cached data item from the write granularity of the memory device associated with the target MU. Thus, the combined size of the cached data item and the subset of the valid data stored at the victim MU equals a write granularity of the memory device. For example, if the size of the cached data item is 4 KB, and the write granularity is 96 KB, the processing logic can determine that the subset of valid data is 92 KB. In some embodiments, the processing logic can identify valid data stored at multiple victim MUs selected garbage collection, and the processing logic can combine the valid data from the multiple victim MUs to add to the cached data item in order to meet the write granularity.

Thus, the processing logic determines that the amount of data needed to pad the cached data item in order to satisfy the write granularity of the target MU is the difference between the write granularity of the memory device and the size of the cached data item. Prior to writing the cached data item and the subset of the valid data to the target MU, the processing logic can compare the difference to a threshold value. If the difference exceeds the threshold value, the processing logic can write the cached data item and the subset of the valid data stored at the victim MU to the target MU. The threshold can be a predetermined size threshold, such as a percentage of the write granularity of the target MU. For example, the size threshold can be 10% of the write granularity of the target MU. Thus, if the difference is greater than 10% of the write granularity of the target MU, the processing logic can write the cached data item and the subset of the valid data to the target MU. If the difference is less than or equal to the threshold value, the processing logic can use dummy data to pad the cached data item.

In some embodiments, the processing can evaluate or identify the valid-to-invalid ratio of the victim MU. The processing logic can then determine whether the valid-to-invalid ratio of the victim MU satisfies a ratio criterion. The ratio criterion can include comparing the valid-to-invalid ratio to a threshold value correlated to the write amplification penalty incurred by garbage collecting the valid data stored at the victim MU. The threshold value can correlate to the write amplification factor at which the memory sub-system is operating. A high valid-to-invalid ratio can imply that the memory sub-system is operating at higher write amplification, while a low valid-to-invalid ratio can imply that the memory sub-system is operating at low write amplification. A valid-to-invalid ratio that exceeds the threshold value indicates that the write amplification penalty associated with padding the cached data with dummy data is likely to have an adverse write amplification effect on the memory sub-system. If the ratio exceeds the threshold value, the processing logic can replace the dummy data with valid data stored at the victim MU. That is, if the ratio exceeds the threshold value, the processing logic can proceed with padding the cached data item with the valid data stored at the victim MU. A ratio that is less than or equal to the threshold value indicates that the write amplification penalty associated with padding the cached data with dummy data is unlikely to adversely affect the write amplification experienced by the memory sub-system. Thus, if the ratio is less than or equal to the threshold value, the processing logic can pad the cached data with dummy data.

In some embodiments, if the ratio is greater than the threshold value, the processing logic executes a first instruction to write the valid data stored at the victim MU to a media management cache. The processing logic can then write, to the target MU, the cached data and at least a subset of the media management cache. If the ratio is less than or equal to the threshold value, the processing logic executes a second instruction to commit the valid data stored at the victim MU to a garbage collection cursor. In some embodiments, responsive to the expiration of a defined period of time, the processing logic can execute an instruction to commit the media management cache to the garbage collection cursor. That is, if a flush command is not received for the defined period of time, the processing logic can perform a garbage collection operation on the media management cache.

Figure 3:
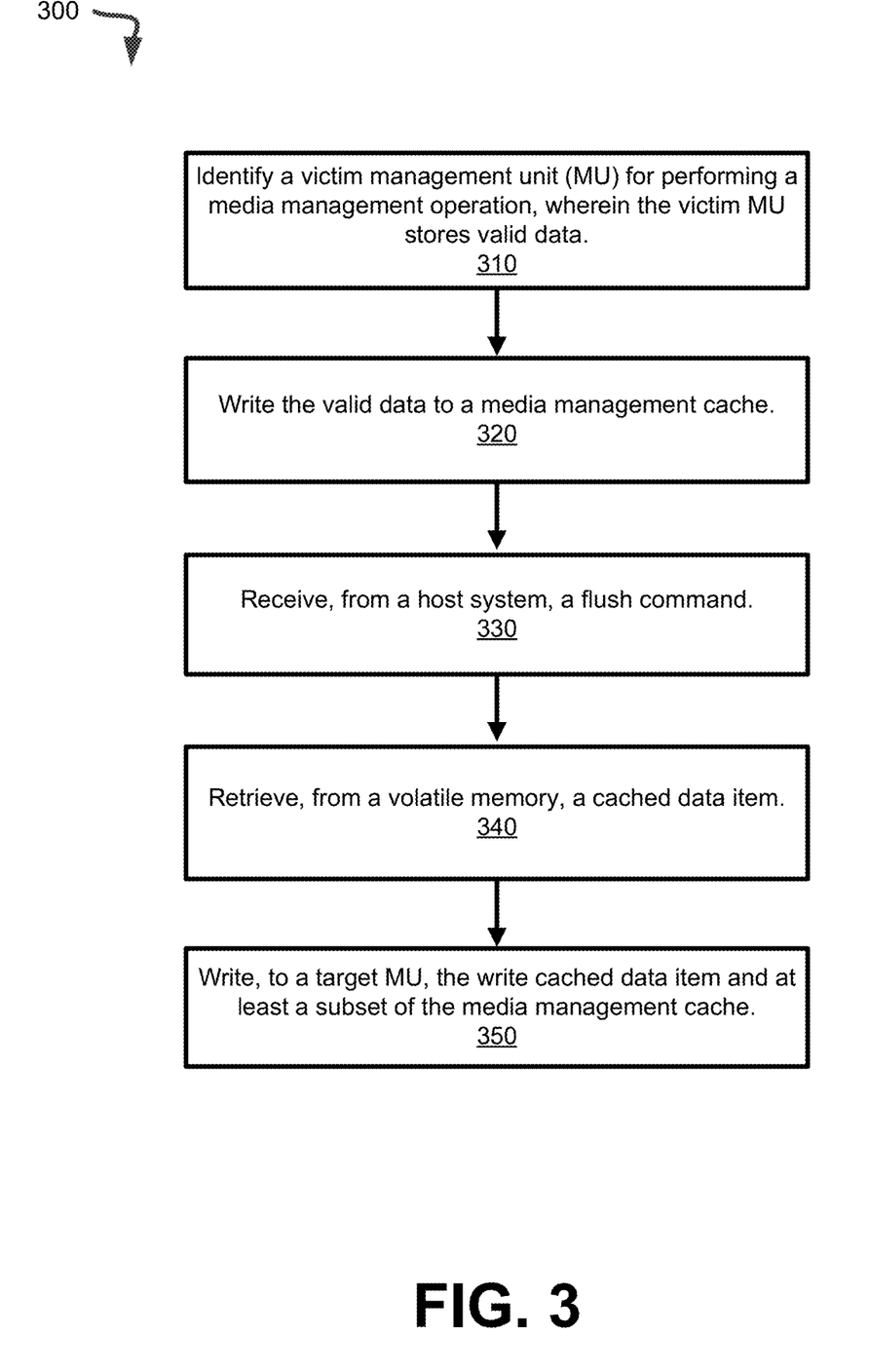
FIG. 3 is a flow diagram of an example method to pad a cached data item with valid data stored in a media management cache, in accordance with some embodiments of the present disclosure.

FIG. 3 is a flow diagram of an example method 300 to pad a cached data item with valid data stored in a media management cache, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the data flush component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies a victim management unit (MU) for performing a media management operation. The victim MU can be selected for a garbage collection operation, for example, and can store valid data. At operation 320, the processing logic writes the valid data stored at the victim MU to a media management cache on volatile memory. In some embodiments, the processing logic can identify the valid-to-invalid ratio of the victim MU, and can determine to write the valid data stored at the victim MU if the valid-to-invalid ratio exceeds a threshold value correlating to the write amplification factor at which the memory sub-system is operating. A high valid-to-invalid ratio can imply that the memory sub-system is operating at higher write amplification, while a low valid-to-invalid ratio can imply that the memory sub-system is operating at low write amplification. Thus, a ratio that exceeds the threshold value indicates that the write amplification penalty associated with padding the cached data item with dummy data is likely to have an adverse write amplification effect on the memory sub-system. Thus, if the ratio exceeds the threshold value, the processing logic can proceed with padding the cached data item with the valid data by writing the valid data to the media management cache. A ratio that is less than or equal to the threshold value indicates that the write amplification penalty associated with padding the cached data item with dummy data is unlikely to adversely affect write amplification experienced by the memory sub-system. Thus, the processing logic can determine not to write the valid data to the media management cached.

At operation 330, the processing logic receives, from a host system, a flush command. The flush command can include an instruction to write the data item(s) stored in a write cache on volatile memory to non-volatile memory. The flush command may not be directed to the media management cache, but rather to a write cache that stores data from write commands received from the host system.

At operation 340, the processing logic retrieves, from a volatile memory, a cached data item. That is, the processing logic identifies a data item stored in the cache storing host data on the volatile memory. In some embodiments, the processing logic can determine that the size of the cached data item is less than the write granularity of the memory device associated with the target MU.

At operation 350, the processing logic writes, to a target MU, the cached data item and at least a subset of the media management cache. The target MU references non-volatile memory. In some embodiments, the target MU can be identified by the processing logic during the garbage collection operation. The target MU can be the MU at which to store the valid data stored at the selected victim MU. In some embodiments, the target MU can be the next available MU referenced by a host cursor, or by a garbage collection cursor in a multi-cursor implementation.

The processing logic can determine the size of the subset of the media management cache by subtracting the size of the cached data item from the write granularity of the memory device associated with the target MU. Thus, the combined size of the cached data item and the subset of the media management cache equal the write granularity of the memory device.

Thus, the processing logic determines that the amount of data needed to pad the cached item in order to satisfy the write granularity of the target MU is the difference between the write granularity of the memory device of the target MU and the size of the cached data item. Prior to writing the cached data item and the subset of the media management cache to the target MU, the processing logic can compare the difference to a threshold value. If the difference exceeds the threshold value, the processing logic can write the cached data item and the subset of the media management cache to the target MU. The threshold can be a predetermined size threshold, such as a percentage of the write granularity of the target MU. For example, the size threshold can be 10% of the write granularity of the target MU. Thus, if the difference is greater than 10% of the write granularity of the target MU, the processing logic can write the cached data item and the subset of the media management cache to the target MU. If the difference is than or equal to the threshold value, the processing logic can use dummy data to pad the cached data item.

In some embodiments, the processing logic can identify that the valid-to-invalid ratio of the victim MU satisfies a ratio criterion. In some embodiments, the memory sub-system controller can maintain the valid-to-invalid ratio. In some embodiments, the processing logic can calculate the valid-to-invalid ratio of the victim MU. The ratio criterion can include comparing the valid-to-invalid ratio to a threshold value correlating to the write amplification penalty incurred by garbage collecting the valid data stored at the victim MU. A ratio that exceeds the threshold value indicates that the write amplification penalty associated with padding the cached data item with dummy data is likely to have an adverse write amplification effect on the write amplification experienced by the memory sub-system. Thus, if the ratio exceeds the threshold value, the processing logic can proceed with padding the cached data item with the subset of the media management cache. That is, the processing logic can commit the cached data item as well as a subset of the media management cache to a host cursor responsive to receiving a flush command. A ratio that is less than or equal to the threshold value indicates that the write amplification penalty associated with padding the cached data item with dummy data is unlikely to adversely affect the write amplification experienced by the memory sub-system. Thus, if the ratio is less than or equal to the threshold value, the processing logic can pad the cached data with dummy data. If the ratio is less than or equal to threshold value, the processing logic can execute an instruction to commit the valid data stored at the victim MU to the garbage collection cursor.

In some embodiments, responsive to the expiration of a defined period of time, the processing logic can execute an instruction to commit the media management cache to the garbage collection cursor. That is, if a flush command is not received for the defined period of time, the processing logic can perform a garbage collection operation on the media management cache.

Figure 4:
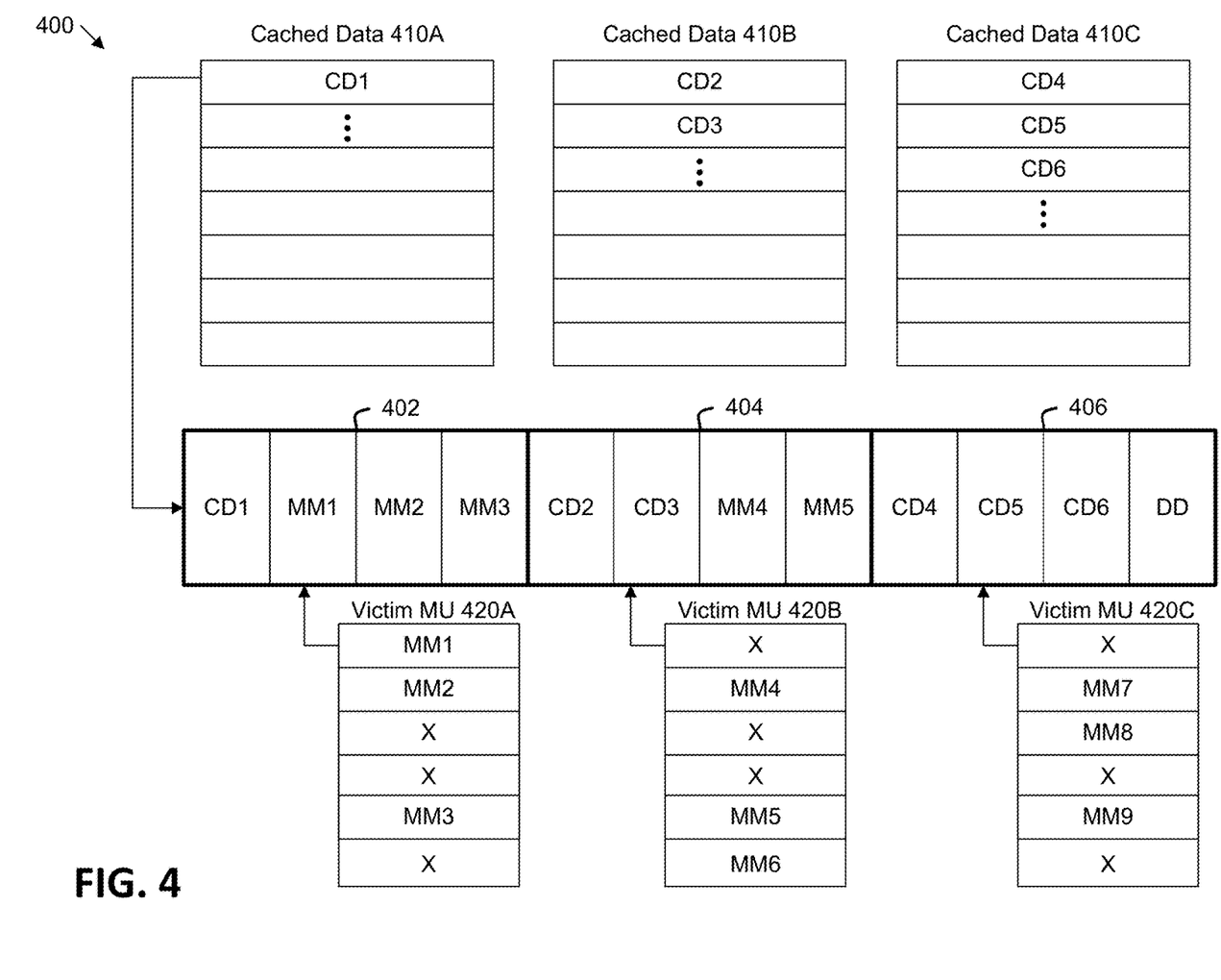
FIG. 4 is a block diagram illustrating target management units used to store cached data items and media management data items, in accordance with some embodiments of the present disclosure.

FIG. 4 illustrates target MUs 402 404, 406 storing cached data items CD1-6 and media management data items MM1-5, in accordance with some embodiments of the present disclosure. As an illustrative example, the data flush component 113 can receive a flush command to flush cached data 410A. The data flush component 113 can identify target MU 402 on non-volatile memory as the location to write the cached data item CD1. For example, a host cursor can indicate target MU 402 as the next available location to write data. The data flush component 113 can determine that the size of CD1 is less than the write granularity of target MU 402, and can determine to pad CD1 with valid data stored at a victim MU selected for a media management operation (e.g., garbage collection). The data flush component 113 can identify victim MU 420A as the victim MU selected for performing garbage collection. Victim MU 420A can store valid data items MM1-3 (the X's represent invalid data stored at victim MU 420A-C). In some embodiments, the data flush component 113 can read the valid data items MMU1-3 stored at a victim MU 420A selected for a media management operation, and can store the valid data to a media management cache (not pictured). In response to receiving a flush command to flush cached data 410A, the data flush component 113 can select MM data items MM1-MM3 to pad the CD1. The amount of MM data to pad CD1 can be the write granularity minus the size of CD1. In this example, the data flush component 113 can identify MM1-3 data items to pad CD1. The data flush component 113 can then write CD1 and MM1-3 to target MU 402.

As another illustrative example, the data flush component 113 can receive a flush command to flush cached data 410B. The data flush component 113 can identify victim MU 420B selected for garbage collection. The data flush component 113 can identify the amount of data from victim MU 420B needed to add to the cached data items CD2-3 in order to satisfy the write granularity. Thus, the data flush component 113 can pad CD2-3 with MM4-5 and write CD2-3 and MM4-5 to target MU 404.

As another illustrative example, the data flush component 113 can receive a flush command to flush cached data 410C. The data flush component 113 can identify victim MU 420C selected for garbage collection. The data flush component 113 can determine that the difference between the write granularity of target MU 406 and the size of cached data 410C is less than the size threshold. In some embodiments, the data flush component 113 can identify the valid-to-invalid ratio for victim MU 420C. In this simplified example, the valid-to-invalid ratio is illustrated as 3-to-3. The data flush component 113 can then compare the valid-to-invalid ratio to a threshold value correlated to an acceptable write amplification penalty incurred due to garbage collecting victim MU 420C. In this example, the valid-to-invalid ratio is equal to or less than the threshold value, and hence the data flush component 113 can determine to generate dummy data (DD) to pad the CD4-6 rather than using the valid data MM7-9 to pad CD4-6. That is, the amount of data needed to meet the write granularity can be so small, or so much smaller than the valid data stored at the victim MU 420C, that generating dummy data to pad CD4-6 is faster and simpler than moving a small subset of the valid data stored at the victim MU 420C. In some embodiments, MM7-9 can be stored in a media management cache. If MM7-9 are stored in the media management for a period of time exceeding a predefined threshold period of time, the data flush component 113 can associate MM7-9 with the garbage collection cursor, which will write the data stored at MM7-9 at a target MU identified by the garbage collection cursor.

In some embodiments, the data flush component 113 can compare the valid-to-invalid ratio of victim MUs 420A-C to a threshold value correlated to the write amplification incurred due to padding the cached data 410A-C with dummy data. If the valid-to-invalid ratio for any of the victim MUs 420A-C is less than the threshold value, the data flush component 113 can determine not to use the valid data stored at the corresponding victim MU 420A-C to pad the cached data items 410A-C. In such instances, the data flush component 113 can use dummy data to pad the cached data item 410A-C.

Figure 5:
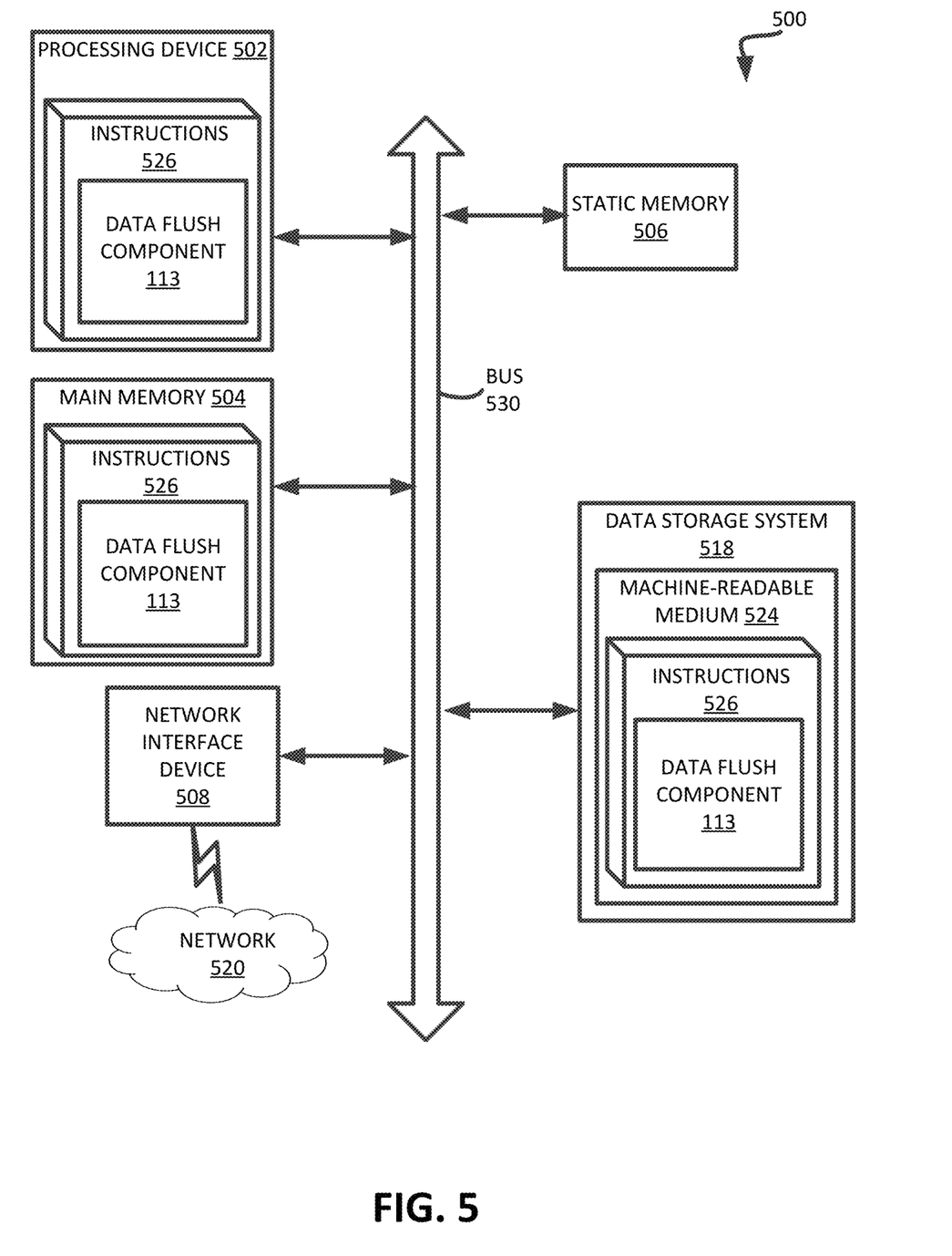
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data flush component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data flush component (e.g., the data flush component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices; and
   a processing device, operatively coupled to the plurality of memory devices, to perform operations comprising:
      identifying a victim management unit (MU) for performing a media management operation, wherein the victim MU stores valid data in a first memory device of the plurality of memory devices;
      identifying, on a second memory device of the plurality of memory devices, a cached data item;
      determining, by comparing a valid-to-invalid ratio of the victim MU to a threshold value, whether to pad the cached data item with one of: at least a subset of the valid data stored at the victim MU or dummy data;
      responsive to determining that the valid-to-invalid ratio of the victim MU exceeds the threshold value, producing a padded data item by padding the cached data item with the at least the subset of the valid data stored at the victim MU and invalidating the subset of the valid data stored at the victim MU used for the padding; and
      writing, to a target MU, the padded data item.

2. The system of claim 1, wherein the operations further comprise:
   determining that a size of the cached data item is less than a write granularity of the target MU.

3. The system of claim 1, wherein a combined size of the cached data item and the subset of the valid data stored at the victim MU equals a write granularity of the target MU.

4. The system of claim 1, wherein the operations further comprise:
   determining a difference between a write granularity of the target MU and a size of the cached data item; and
   wherein the cached data item and the at least the subset of the valid data stored at the victim MU is written, to the target MU, responsive to determining that the difference exceeds a second threshold value.

5. The system of claim 1, wherein the target MU references non-volatile memory.

6. The system of claim 1, wherein the operations further comprise:
   responsive to determining that the valid-to-invalid ratio exceeds the threshold value, executing an instruction to write the valid data stored at the victim MU to a media management cache.

7. The system of claim 1, wherein the operations further comprise:
   responsive to determining that the valid-to-invalid ratio is less than or equal to the threshold value, executing an instruction to commit the valid data stored at the victim MU to a garbage collection cursor.

8. A method comprising:
   identifying, by a processing device, a victim management unit (MU) for performing a media management operation, wherein the victim MU stores valid data in a first memory device of a plurality of memory devices;
   identifying, on a second memory device of the plurality of memory devices, a cached data item;

determining, by comparing a valid-to-invalid ratio of the victim MU to a threshold value, whether to pad the cached data item with one of: at least a subset of the valid data stored at the victim MU or dummy data;

responsive to determining that the valid-to-invalid ratio of the victim MU is greater than or equal to the threshold value, producing a padded data item by padding the cached data item with the at least the subset of the valid data stored at the victim MU and invalidating the subset of the valid data stored at the victim MU used for the padding; and writing, to a target MU, the padded data item.

9. The method of claim 8, wherein the target MU references non-volatile memory.

10. The method of claim 8, further comprising:
determining that a size of the cached data item is less than a write granularity of the target MU.

11. The method of claim 8, wherein a combined size of the cached data item and the subset of the valid data stored at the victim MU equals a write granularity of the target MU.

12. The method of claim 8, further comprising:
determining a difference between a write granularity of the target MU and a size of the cached data item; and
wherein the cached data item and the at least the subset of the valid data stored at the victim MU is written, to the target MU, responsive to determining that the difference exceeds a second threshold value.

13. The method of claim 8, further comprising:
responsive to determining that the valid-to-invalid ratio exceeds the threshold value, executing a first instruction to write the valid data stored at the victim MU to a media management cache; and
responsive to determining that the valid-to-invalid ratio is less than or equal to the threshold value, executing a second instruction to commit the valid data stored at the victim MU to a garbage collection cursor.

14. A non-transitory computer-readable storage medium comprising instructions that, when executed by a processing device, cause the processing device to perform operations comprising:
identifying a victim management unit (MU) for performing a media management operation, wherein the victim MU stores valid data in a first memory device of a plurality of memory devices;
identifying, on a second memory device of the plurality of memory devices, a cached data item;
determining, by comparing a valid-to-invalid ratio of the victim MU to a threshold value, whether to pad the cached data item with one of: at least a subset of the valid data stored at the victim MU or dummy data;
responsive to determining that the valid-to-invalid ratio of the victim MU exceeds the threshold value, producing a padded data item by padding the cached data item with the at least the subset of the valid data stored at the victim MU and invalidating the subset of the valid data stored at the victim MU used for the padding; and
writing, to a target MU, the padded data item.

15. The non-transitory computer-readable storage medium of claim 14, further comprising:
determining that a size of the cached data item is less than a write granularity the target MU.

16. The non-transitory computer-readable storage medium of claim 14, wherein a combined size of the cached data item and the subset of the valid data stored at the victim MU equals a write granularity of the target MU.

17. The non-transitory computer-readable storage medium of claim 14, further comprising:
determining a difference between a write granularity of the target MU and a size of the cached data item; and
wherein the cached data item and the at least the subset of the valid data stored at the victim MU is written, to the target MU, responsive to determining that the difference exceeds a second threshold value.

18. The non-transitory computer-readable storage medium of claim 14, wherein the target MU references non-volatile memory.

19. The non-transitory computer-readable storage medium of claim 14, further comprising:
responsive to determining that the valid-to-invalid ratio exceeds the threshold value, executing an instruction to write the valid data stored at the victim MU to a media management cache.

20. The non-transitory computer-readable storage medium of claim 14, further comprising:
responsive to determining that the valid-to-invalid ratio is less than or equal to the threshold value, executing an instruction to commit the valid data stored at the victim MU to a garbage collection cursor.

* * * * *